United States Patent [19]

Isomoto et al.

[11] Patent Number: 5,237,974
[45] Date of Patent: Aug. 24, 1993

[54] TRIPLE-INTAKE-VALVE INTERNAL COMBUSTION ENGINE

[75] Inventors: Jun Isomoto, Kyoto; Masaji Mukao, Kameoka; Yoshinori Shiomi, Kyoto, all of Japan

[73] Assignee: Mitsubishi Jidosha Kogyo Kabushiki Kaisha, Tokyo, Japan

[21] Appl. No.: 956,741

[22] Filed: Oct. 6, 1992

[30] Foreign Application Priority Data

Oct. 7, 1991 [JP] Japan .................................. 3-259394

[51] Int. Cl.⁵ .............................................. F02B 15/00
[52] U.S. Cl. ..................................... 123/432; 123/302
[58] Field of Search ............... 123/52 M, 52 MC, 302, 123/308, 432

[56] References Cited

U.S. PATENT DOCUMENTS

| | | | |
|---|---|---|---|
| 4,667,636 | 5/1987 | Oishi et al. | 123/432 |
| 4,683,855 | 8/1987 | Laimbeck | 123/432 |
| 4,702,207 | 10/1987 | Hatamura et al. | 123/302 |
| 4,766,866 | 8/1988 | Takii et al. | 123/432 |
| 4,877,004 | 10/1989 | Nishizawa | 123/432 |
| 4,938,191 | 7/1990 | Oldani et al. | 123/432 |
| 5,016,578 | 5/1991 | Ogawa et al. | 123/52 MC |
| 5,119,785 | 6/1992 | Saito et al. | 123/432 |
| 5,125,380 | 6/1992 | Nakae et al. | 123/302 |
| 5,143,036 | 9/1992 | Shiraishi et al. | 123/308 |

FOREIGN PATENT DOCUMENTS 323314 1/1991 Japan .

Primary Examiner—E. Rollins Cross
Assistant Examiner—Erick Solis
Attorney, Agent, or Firm—Wegner, Cantor, Mueller & Player

[57] ABSTRACT

Intake ports are arranged independently from each other between an injector and each combustion chamber and are formed in an inverted triangular cross-sectional shape, whereby intake fluids flow along upper walls of the corresponding ports and become a stratified tumble flow in the combustion chamber 10. One of the three ports, said one port being centrally located and opposing a spark plug, is used as an air-fuel intake port, while the remaining ports arranged on both sides of the port are employed as air intake ports. A fuel injector is provided to feed fuel only to the port. An air-fuel mixture drawn into the combustion chamber through the port flows as a tumble flow. This tumble flow is flanked by tumble flows of air drawn into the combustion chamber through the ports respectively, whereby tumble flows flow in the form of a three-layer tumble swirl as a whole.

6 Claims, 4 Drawing Sheets

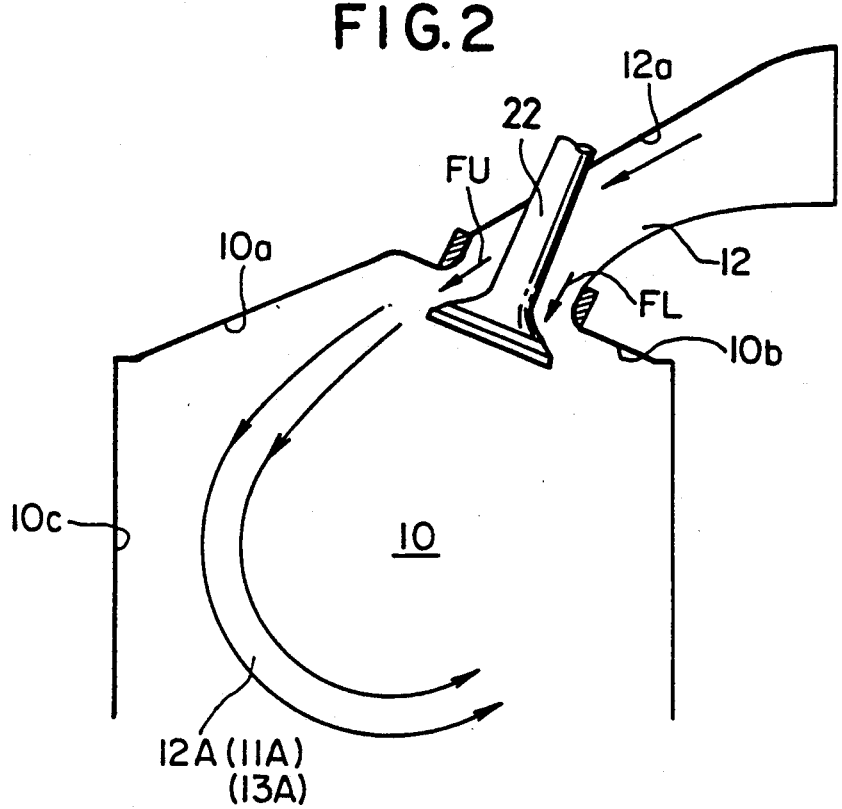
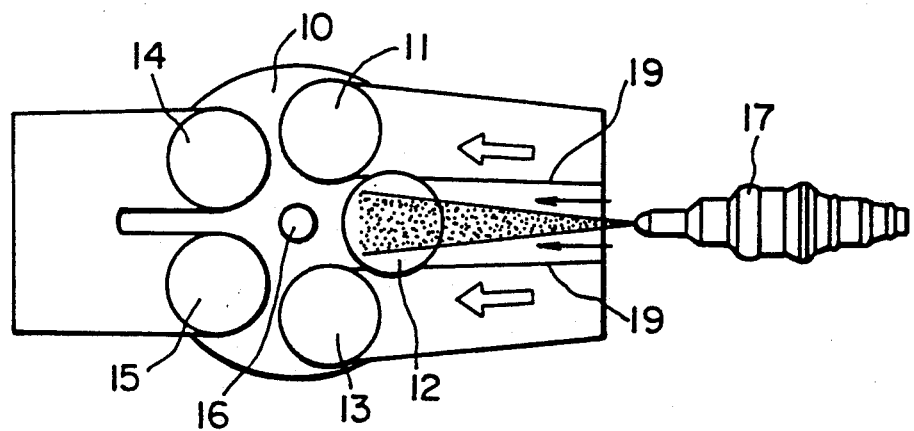
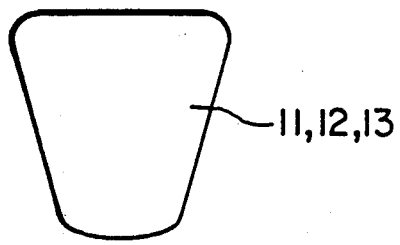

TRIPLE-INTAKE-VALVE INTERNAL COMBUSTION ENGINE

BACKGROUND OF THE INVENTION

1) Field of the Invention

This invention relates to a triple-intake-valve internal combustion engine, namely, to an internal combustion engine having three intake valves per combustion chamber.

2) Description of the Related Art

Five-valve engines having three intake valves on an intake side and two exhaust valves on an exhaust side are already known. One example of such conventional five-valve engines is illustrated in FIGS. 10 and 11. In these examples, three intake ports 2,3,4 and two exhaust ports 5,6 open at their respective ends through a ceiling of each combustion chamber 1 of the pentroof type. These ports are opened and closed by unillustrated intake valves and exhaust valves at appropriate timing. The intake ports 2,3,4 are branched near the combustion chamber 1, and a fuel injector 8 is arranged in a branching portion 7 where a common intake port branches into the individual intake ports 2,3,4. The fuel injector 8 is constructed such that fuel can be injected in substantially equal amounts into the three intake ports 2,3,4.

The fuel injector 8 is controlled in such a way that an air-fuel mixture to be fed therethrough has substantially a stoichiometric air/fuel ratio. Flows 2A,3A,4A of the air-fuel mixture drawn through the respective intake ports 2,3,4 flow in the form of swirls throughout the combustion chamber 1 as shown in FIG. 10, whereby the flows 2A,3A,4A are agitated. Described in more detail, the intake ports 2,3,4 are branched near the combustion chamber 1 so that the directions of the flows 2A,3A,4A are not parallel with each other. As a result, the flows 2A,3A,4A are fully agitated in the combustion chamber 1. According to such an intake system structure, ideal instantaneous combustion can be achieved by the agitating effects of the triple tumble flows, thereby bringing about the characteristic advantages that high combustion efficiency and hence high output can be obtained.

Recently, there is urgent necessity to develop an engine of high fuel economy from the viewpoint of energy saving. The engine shown in FIG. 10, however, still provides insufficient fuel economy although it features high output owing to high combustion efficiency.

In the meantime, an engine permitting combustion of fuel at an air-fuel ratio leaner than the stoichiometric air-fuel ratio has been disclosed in Japanese Patent Application Laid-Open (Kokai) No. HEI 3-23314. The engine is provided with at least two intake ports. Fuel is injected into only one of the intake ports to use it as an air-fuel mixture feed passage and the other intake port is used as an air feed passage, whereby a tumble flow of the air-fuel mixture and a tumble flow of air are formed in a combustion chamber under barrel-stratification. The tumble flow of the air-fuel mixture is then ignited. Although this patent publication also discloses one embodiment of an engine having three intake ports, the intake port located on one side is used as a feed passage for an air-fuel mixture. When a tumble flow of the air-fuel mixture in the combustion chamber is ignited to burn, one side of the tumble flow is an inner wall of the combustion chamber so that the efficiency of oxygen utilization is impaired. Further, the cross-sectional shape of each intake port is circular so that formation of the intake port into a straight shape with a view toward a stronger tumble flow in the combustion chamber results in the crossing of the intake port at an acute angle with its opening to the combustion chamber. As a consequence, the cross-sectional flow area of each intake port is substantially reduced. In other words, a stronger tumble flow results in a reduction in the maximum flow rate of each intake port having a circular cross-section, whereby the performance of the engine at full power is lowered.

SUMMARY OF THE INVENTION

An object of the present invention is to provide a triple-intake-valve internal combustion engine which has three intake ports per combustion chamber, permits efficient combustion at an air/fuel ratio leaner than the stoichiometric air/fuel ratio and overcomes any reduction in the performance of the engine under full acceleration.

In one aspect of the present invention, there is thus provided a triple-intake-valve internal combustion engine having three intake ports per combustion chamber, said intake ports communicating with the corresponding combustion chamber, and three intake valves disposed in openings of the respective intake ports to the combustion chamber, comprising:

a spark plug located in a ceiling of the combustion chamber at a position opposing the central intake port of the three intake ports; and means for injecting fuel into the central intake port;

wherein the three intake ports are formed independently from each other so that an air-fuel mixture drawn into the combustion chamber through the central intake port and air drawn into the combustion chamber through the remaining two intake ports form a three-layer tumble flow, and the three intake ports have a cross-sectional shape of greater width in their upper half thereof than in their lower half thereof.

In the intake stroke of the engine, an air-fuel mixture leaner than the stoichiometric air/fuel ratio is drawn through the air-fuel mixture intake port. This air-fuel mixture flows as a vertical swirl, namely, as a tumble flow, in the combustion chamber. On the other hand, air alone is drawn through the air intake ports disposed on both sides of the air-fuel mixture intake port, so that the air flows as vertical swirls, namely, tumble flows while flanking the tumble flow of the lean air-fuel mixture on both sides thereof under barrel-stratification. The tumble flow of the lean air-fuel mixture and the tumble flows of air therefore flow as a three-layer stream in the combustion chamber, with the former tumble flow being flanked on both sides thereof by the latter tumble flows. The spark plug produces a spark toward the swirl of the air-fuel mixture in the three-layer stream.

Since the individual intake ports are formed independently from each other to produce tumble flows of intake fluids in the combustion chamber, fuel is injected into the centrally-located intake port and air alone is drawn through the intake ports located on both sides of the central intake port, a layer-shaped flow of an air-fuel mixture richer than a swirl of air alone occurs in the combustion chamber so that the air-fuel mixture in a state not spread all over the combustion chamber is ignited. In addition, the combustion of the air-fuel mixture can effectively use the oxygen in the air on both sides thereof in the combustion chamber. The combustion efficiency is therefore good even when the air-fuel mixture is leaner than the stoichiometric air/fuel ratio. This has made it possible to achieve enhanced fuel economy in addition to the inherent high output and combustion efficiency of the triple-intake-valve internal combustion engine.

Further, each intake port has a cross-sectional shape of greater width in the upper half thereof than in the lower half thereof so that each tumble flow in the combustion chamber can be strengthened without resulting in a reduction in the maximum flow rate of the corresponding intake port. It is therefore possible to exhibit the effects that good combustion of a lean air-fuel mixture by the promotion of stratification in the combustion chamber and assurance of a maximum output through the assurance of a maximum flow rate can both be achieved.

BRIEF DESCRIPTION OF THE DRAWINGS

The above and other objects, features and advantages of the present invention will become apparent from the following description of the invention and the appended claims, taken in conjunction with the accompanying drawings, in which:

FIG. 2 is a side view for describing tumble flows formed in a combustion chamber 10 of the engine of FIG. 1;

FIG. 3 is a plan view showing relative positions of intake ports 11,12,13, exhaust ports 14,15, the combustion chamber 10, a fuel injector 17 and a spark plug 16 in the engine of FIG. 1;

FIG. 4 is a schematic illustration of the cross-sectional shape of the intake ports 11,12,13 in the engine of FIG. 1;

DETAILED DESCRIPTION OF THE INVENTION AND PREFERRED EMBODIMENTS

Figure 1:
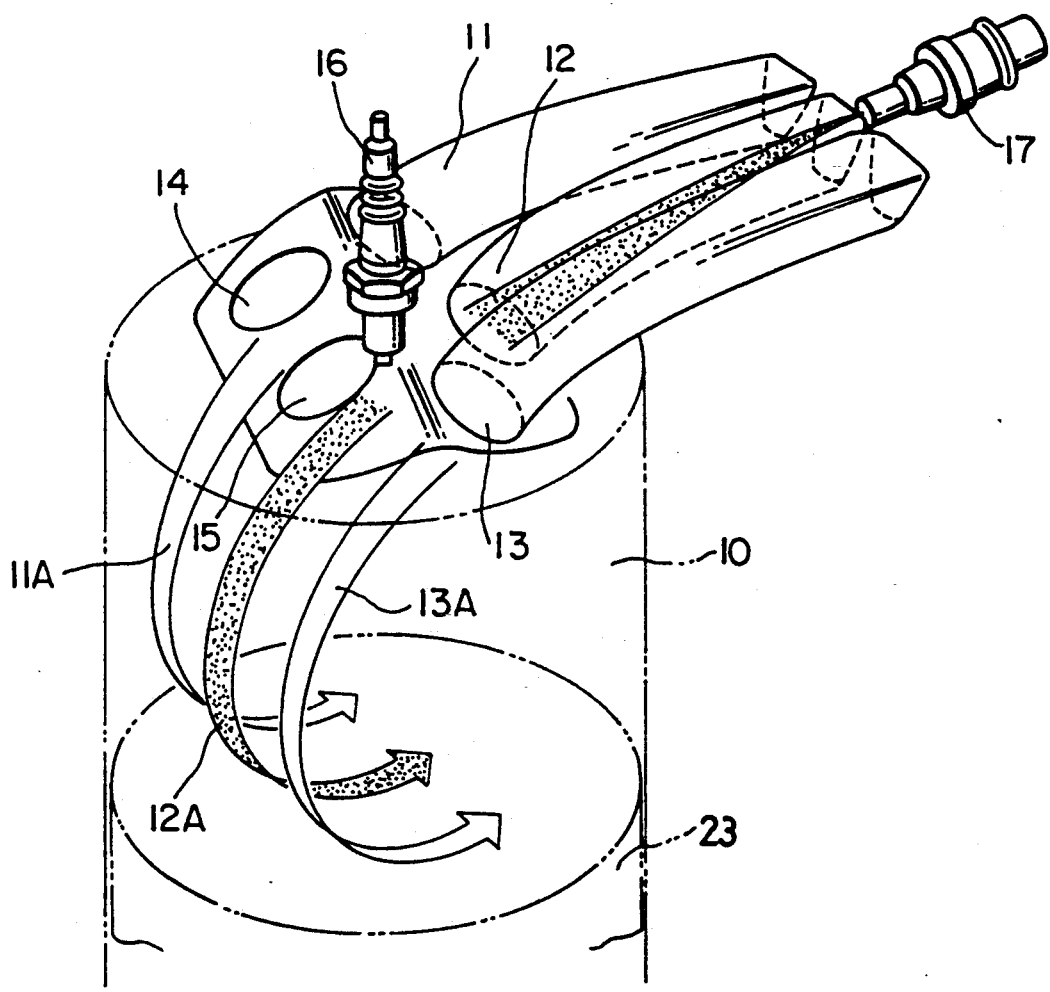
FIG. 1 is a simplified perspective view of an engine according to one embodiment of this invention.

Referring first to FIGS. 1-3, a ceiling of the combustion chamber 10 is constructed in the form of a pentroof having two tilted walls 10a,10b. The three intake ports 11,12,13 opened and closed by their respective intake valves 22 (only the intake valve 22 for the intake port 12 is shown in FIG. 2) open through the tilted wall 10b while the exhaust ports 14,15 opened and closed by their respective exhaust valves (not shown) open through the tilted wall 10a. The spark plug 16 is located centrally in the ceiling of the combustion chamber 10. At a suitable position of an intake passage, a fuel injector 17 is disposed as a fuel injecting means. Each intake port is formed in such a shape that the air-fuel mixture or air drawn therethrough flows along the tilted wall 10a of the pentroof-shaped roof in the combustion chamber 10.

The intake ports 11,12,13 arranged between the fuel injector 17 and the combustion chamber 10 are formed as independent ports isolated from each other by partitions 19,19. Each intake port is formed in an inverted triangular cross-sectional shape (see the broken lines in FIG. 1) so that the air or air-fuel mixture flows along an upper wall 12a thereof (the upper wall of the port 12 alone is shown in FIG. 2). Owing to the tilted wall 10a of the pentroof-shaped roof and the cross-sectional shape of each intake port, each flow supplied to the combustion chamber 10 takes the form of a vertical swirl, in other words, a tumble flow.

The fuel injector 17 injects a controlled amount of fuel to one of the three intake ports, namely, to the intake port 12 located centrally. The intake port 12 will hereinafter be called the "air-fuel mixture intake port 12". The air-fuel mixture intake port 12 is arranged at such a position that a tumble flow 12A of the air-fuel mixture can be fed toward an ignition range of the spark plug 16. On the other hand, the intake ports 11,13 located on both sides of the air-fuel mixture intake port 12 serve to draw only air. These ports will hereinafter be called the "air intake ports 11,13". By the tumble flow 12A of the air-fuel mixture and the tumble flows 11A,13A of air formed on both sides of the tumble flow 12A, a three-layer tumble flow is formed under barrel-stratification.

Here, the intake ports 11,12,13 will be described in more detail. As depicted in FIG. 3, these intake ports 11,12,13 comprises straight ports arranged substantially in parallel with each other. The cross-sectional shape of each of the intake ports 11,12,13 is formed, as shown in detail in FIG. 4, wider in the upper half than in the lower half so that the center of an intake flow through the intake port is biased toward the upper half of the intake port. Owing to this construction, tumble flows are promoted in the combustion chamber 10 without resulting in a reduction in the maximum flow rates of the intake ports. A further description will be made of this feature. In the flow from each intake port into the combustion chamber 10, an upper half flow FU is a flow component which forms a tumble flow, so that the entry of the upper half flow FU into the combustion chamber 10 is practically not inhibited by the tumble flow itself. Conversely, a lower half flow FL is a flow component which inhibits the advance of the tumble flow, whereby the entry of the lower half flow FL into the combustion chamber 10 is inhibited by the tumble flow itself. The design to increase the upper half flow FU, therefore, promotes the tumble flow in the combustion chamber 10 without resulting in a reduction in the maximum flow rate from each intake port into the combustion chamber 10.

As is apparent from FIGS. 1 and 3, the fuel injector 17 is preferably directed toward an opening of the central port 12 to the combustion chamber 10 so that fuel is injected without adhesion on an inner wall of the central intake port 12.

Operation of the embodiment constructed as described above will next be described.

In the intake stroke in which the intake valves 22 open and a piston 23 moves downwardly, a flow 12A of an air-fuel mixture containing fuel injected from the fuel injector 17 is drawn through the air-fuel mixture intake port 12 while flows 11A,13A of air only are drawn into the combustion chamber 10 through the air intake ports 11,13, respectively.

Because the cross-sectional shape of each of the ports 11,12,13 is an inverted triangle, the intake flow of the air-fuel mixture or air is greater in quantity on an upper side of the intake port and enters the combustion chamber 10 while maintaining its directionality. The intake flows 11A,12A,13A, to which the above directionality has been imparted, first change their direction along the tilted wall 10a, advance downwardly along a cylinder wall 10c and, after reaching a top of the piston 23, ascend along the cylinder wall 10c. Accordingly, the intake flows advance as tumble flows 11A,12A,13A subsequent to their entry in the combustion chamber 10.

These tumble flows 11A,12A,13A of the air-fuel mixture or air will next be discussed from a different viewpoint. In the combustion chamber 10, there are the fuel-free air flows 11A,13A on both sides of the air-fuel mixture flow 12A as a central layer so that a tumble flow of the three-layer structure is produced under barrel-stratification. It is important that mixing of the individual layers of this stratified tumble flow be prevented as much as possible until the end of the compression stroke. For this purpose, the individual intake ports are subtly arranged in suitable directions, respectively.

The tumble flows 11A,12A,13A, which flow in the form of three layers, are present while maintaining their respective directionality. When the piston has move upward and the compression stroke approaches its end, the three tumble flows become a number of minute swirls in the combustion chamber 10 so compressed. At this time, the tumble flow 12A of the air-fuel mixture is compressed in the state of a richer air-fuel ratio than the fuel-free tumble flows 11A,13A.

The spark plug 16 is located in the tumble flow 12A of the richer air-fuel mixture compared with the tumble flows 11A,13A. When this air-fuel mixture is ignited at an appropriate timing, the resulting flame spreads all over the combustion chamber 10. At the time of the ignition, the air-fuel mixture has not spread yet throughout the combustion chamber 10 and, moreover, the air-fuel mixture is flanked on both sides thereof by the air entered through the intake ports 11,13 and containing sufficient oxygen. The time required for the combustion of the air-fuel mixture is therefore extremely short so that, despite the air-fuel mixture is lean when taken as the overall intake, a stable state of combustion is achieved and the combustion efficiency is also good. The use of such a lean air-fuel mixture as an overall intake can therefore reduce the fuel consumption rate.

Where a lean air-fuel mixture is spread all over a combustion chamber, it is known that a longer time is required until the air-fuel mixture burns in its entirety. The air-fuel mixture tumble flow 12A, which is flanked by fuel-free air tumble flows 11A,13A drawn with the directionality and is by itself imparted with the directionality as described above, is ignited before it spreads all over the combustion chamber 10. As a result, its combustion requires a short time and, moreover, is stable.

In particular, the intake ports 11,12,13 have an inverted triangular cross-sectional shape as described above. This makes it possible to produce strong tumble flows in the combustion chamber 10 without resulting in a reduction in the maximum flow rates from the individual intake ports into the combustion chamber 10. It is therefore possible not only to achieve sufficient stratification in the combustion chamber 10, said sufficient stratification being considered necessary to burn a lean air-fuel mixture as an overall intake, but also sufficient maximum flow rates from the intake ports 11,12,13 into the combustion chamber 10, said sufficient maximum flow rates being regarded indispensable for the assurance of a maximum output at full power of an engine.

To obtain a lean air-fuel mixture, selection of a fuel injection rate conforming with the state of operation of an engine is needed. Air-fuel ratios optimal to individual operation states of the engine, said ratios including the stoichiometric air/fuel ratio but mostly air/fuel ratios leaner than the stoichiometric air/fuel ratio, are hence stored as a map of preset target air/fuel ratios in a controller. Also used is an air/fuel ratio sensor whose characteristics vary linearly in accordance with variations in the air/fuel ratio in exhaust gas. By detecting the state of operation of the engine via the air/fuel ratio sensor, an optimal air/fuel ratio at this time is derived from the map so that the fuel injection rate is determined.

Figure 5:
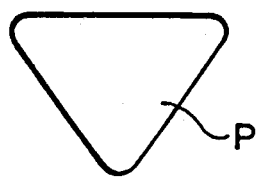
FIGS. 5-9 are schematic illustrations of other examples of the cross-sectional shape of the intake ports.
Figure 6:
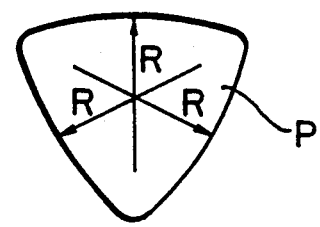
Figure 7:
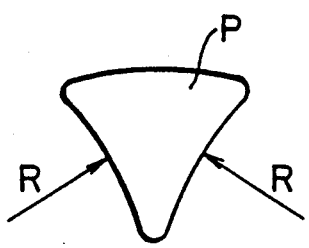
Figure 8:
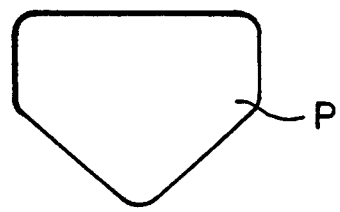
Figure 9:
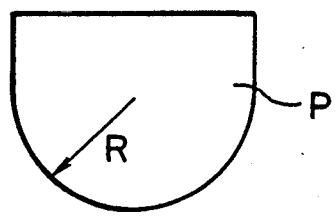
Figure 10:
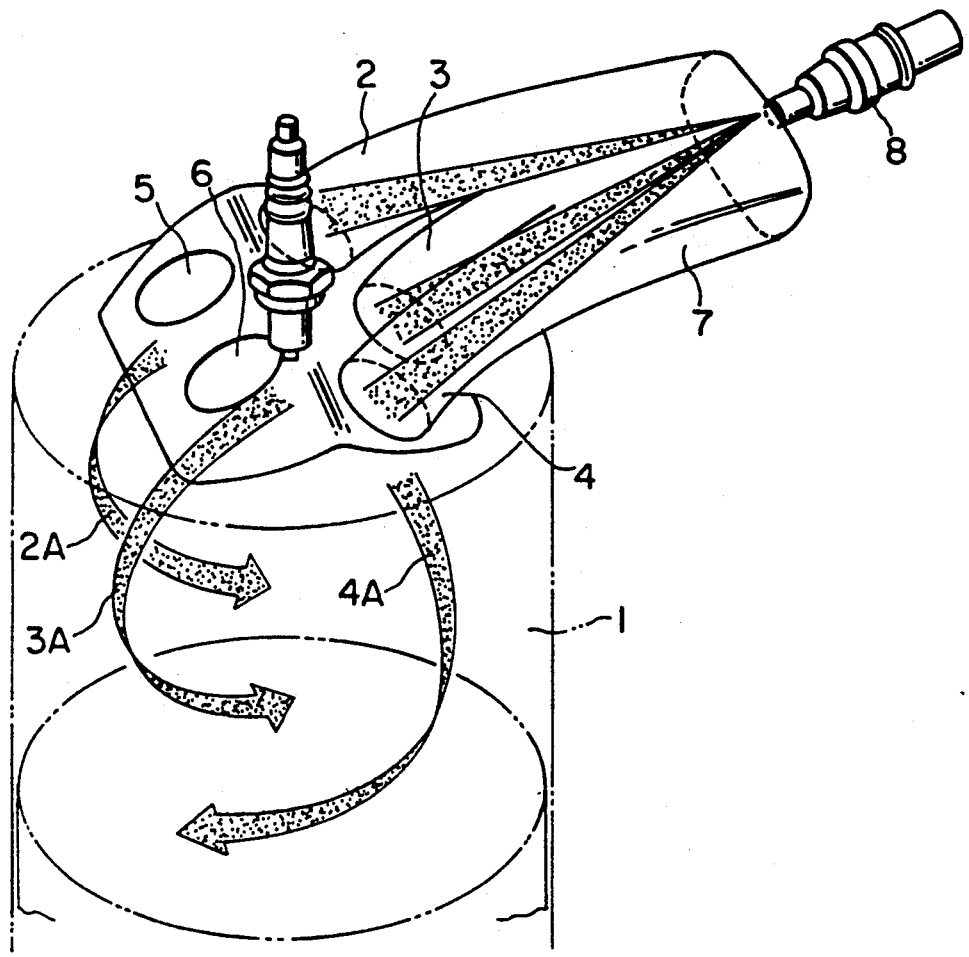
FIG. 10 is a simplified perspective view of a conventional five-valve engine.
Figure 11:
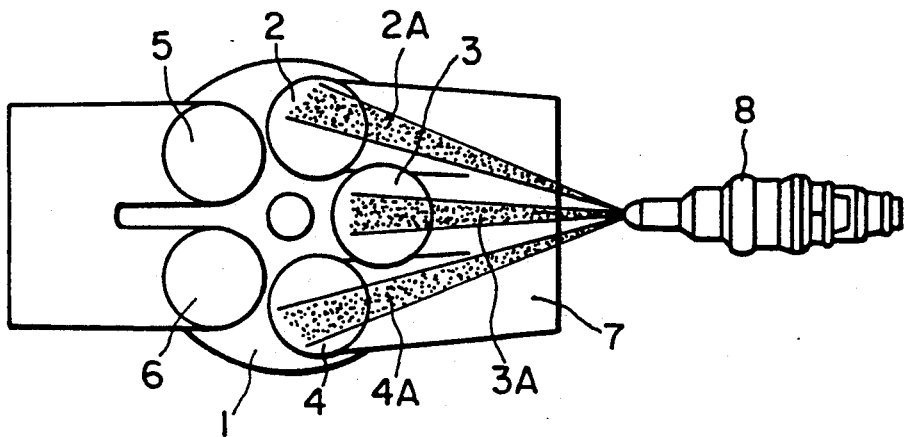
FIG. 11 is a plan view of the conventional engine of FIG. 10.

Regarding the cross-sectional shapes of the intake ports 11,12,13, modifications such as those shown by letter P in FIGS. 5–9 are also usable. The cross-sectional shape depicted in FIG. 5 is a triangle with the corners chamfered or rounded only a little. The cross-sectional shape illustrated in FIG. 6 is basically a triangle with each side being formed of a curve whose radius is R. The cross-sectional shape shown in FIG. 7 is basically a triangle with two sides being formed of concave curves having a radius of R. The cross-sectional shape of FIG. 8 is basically a triangle shape with upper parts of two sides extending in parallel to each other, so that it has a shape like a baseball home plate. The cross-sectional shape shown in FIG. 9 is similar to that illustrated in FIG. 8 except that its lower part is defined by a curve whose radius is R.

One embodiment of the present invention has been described above. As a modification thereto, it is also possible to provide one or two additional fuel injectors for the intake port 11 and/or the intake port 13 so that fuel can also be injected from the additional fuel injector or injectors when a higher output is required.

What is claimed is:

1. A triple-intake-valve internal combustion engine having three intake ports per combustion chamber, said intake ports communicating with the corresponding combustion chamber, and three intake valves disposed in openings of the respective intake ports to the combustion chamber, comprising:
   a spark plug located in a ceiling of the combustion chamber at a position opposing the central intake port of the three intake ports; and
   means for injecting fuel into the central intake port;
   wherein the three intake ports are formed independently from each other so that an air-fuel mixture drawn into the combustion chamber through the central intake port and air drawn into the combustion chamber through the remaining two intake ports form a three-layer tumble flow, and the three intake ports have a cross-sectional shape of greater width in the upper half thereof than in the lower half thereof.

2. The engine of claim 1, wherein the form of each of the three intake ports is wider in the upper half than in the lower half so that the cross-sectional shape thereof is substantially an inverted triangle.

3. The engine of claim 1, wherein the three intake ports are formed independently from each other from a position in the vicinity of a point of fuel injection by the fuel injection means to the corresponding openings to the combustion chamber.

4. The engine of claim 1, wherein the ceiling of the combustion chamber is substantially of a pentroof shape formed of two tilted walls.

5. The engine of claim 4, wherein the three intake ports open through one of the tilted walls of the ceiling of the combustion chamber and at least one exhaust port opens through the other tilted wall.

6. The engine of claim 1, wherein the fuel injection means is directed toward the opening of the central port to the combustion chamber so that the fuel is injected without adhesion on an inner wall of the central intake port.

* * * * *